(12) United States Patent
Nodehi Fard Haghighi et al.

(10) Patent No.: US 9,386,008 B2
(45) Date of Patent: Jul. 5, 2016

(54) SECURE INSTALLATION OF ENCRYPTION ENABLING SOFTWARE ONTO ELECTRONIC DEVICES

(71) Applicant: SmartGuard, LLC, Minneapolis, MN (US)

(72) Inventors: Khashayar Nodehi Fard Haghighi, Maple Grove, MN (US); Sasan Mokhtari, Eden Prairie, MN (US); Erik Amundson, Rogers, MN (US); Naveen Ranganath, Plymouth, MN (US); Anthony Sorvari, Shoreview, MN (US); David Heim, Minneapolis, MN (US)

(73) Assignee: SmartGuard, LLC, Minneapolis ( * ) Notice: Subject to any disclaimer, the term of this patent is extended or adjusted under 35 U.S.C. 154(b) by 0 days.

(21) Appl. No.: 14/047,596

(22) Filed: Oct. 7, 2013

(65) Prior Publication Data
US 2015/0052351 A1 Feb. 19, 2015

Related U.S. Application Data

(60) Provisional application No. 61/867,440, filed on Aug. 19, 2013.

(51) Int. Cl.
H04L 29/06 (2006.01)
(52) U.S. Cl.
CPC ........ H04L 63/0823 (2013.01); H04L 63/0428 (2013.01); H04L 63/06 (2013.01)
(58) Field of Classification Search
None
See application file for complete search history.

(56) References Cited

U.S. PATENT DOCUMENTS

| | | | |
|---|---|---|---|
| 6,763,459 B1* | 7/2004 | Corella | 713/156 |
| 2003/0222762 A1* | 12/2003 | Beigl et al. | 340/5.92 |
| 2003/0233289 A1* | 12/2003 | Yang et al. | 705/28 |
| 2004/0068566 A1* | 4/2004 | Ogawa | 709/226 |
| 2009/0019367 A1* | 1/2009 | Cavagnari et al. | 715/716 |
| 2010/0202450 A1* | 8/2010 | Ansari et al. | 370/389 |

(Continued)

OTHER PUBLICATIONS

Stallings, Cryptography and Network Security: Principles and Practice, Second Edition, 1999, pp. 444-445.*

*Primary Examiner* — Benjamin Lanier
(74) *Attorney, Agent, or Firm* — Vidas Arrett & Steinkraus

(57) ABSTRACT

A process/method is provided, which authenticates electronic devices allowing the installation and utilization of encryption enabling software capable of facilitating a public key infrastructure in combination with electronic devices without need for such encryption enabling software capable of facilitating a public key infrastructure to be installed at the same time as manufacture of the electronic device. The disclosed process/method may then provide a system for monitoring various metrics and statuses of the electronic devices through the manufacturing chain, distribution chain and product lifecycle. The process/method can be utilized to create electronic devices secured with encryption enabling software capable of facilitating a public key infrastructure, free from the security risks inherent with the current method of installing encryption enabling software onto electronic devices, which will render such secured electronic devices suitable for tasks requiring such enhanced security or encryption. Moreover, electronic devices utilizing the disclosed process/method to install encryption enabling software capable of facilitating a public key infrastructure will be enabled to benefit from and facilitate public key infrastructure functionality, including, but not limited to, the renew encryption enabling software on a defined renewal interval.

10 Claims, 18 Drawing Sheets

(56) References Cited

U.S. PATENT DOCUMENTS

| | | |
|---|---|---|
| 2012/0066767 A1 | 3/2012 | Vimpari |
| 2012/0123845 A1 | 5/2012 | Junger et al. |
| 2012/0284514 A1 | 11/2012 | Lambert |
| 2012/0290427 A1 | 11/2012 | Reed et al. |
| 2013/0152180 A1 | 6/2013 | Nair et al. |
| 2014/0310822 A1* | 10/2014 | Suzuki et al. .................. 726/29 |

* cited by examiner

Electronic Device Certificate Enrollment Process ically, the disclosure relates to a novel implementation of a method, a system, and a process for securely associating, communicating, distributing, and otherwise installing authentication and encryption enabling software (including, but not necessarily limited to, a digital certificate) capable of facilitating a public key infrastructure separately in time from the date of manufacture of an electronic device, thereby eliminating third party entities with knowledge of sensitive details of the encryption enabling software, thus decreasing the risk of infiltration and exposure to security risks while enabling electronic devices to benefit from public key infrastructure functionality. An embodiment of the present disclosure relates to a further method, system, and process for the facilitation of various elements of a public key infrastructure comprised of the continued update or renewal of authentication and encryption enabling software capable of facilitating a public key infrastructure installed on electronic devices.

BACKGROUND OF THE INVENTION

The invention is comprised of a process for both authenticating electronic devices and installing encryption enabling software capable of facilitating a public key infrastructure onto electric devices at a time separate from their date of manufacture. The process under current use in the art involves supplying the third party manufacturer of electronic devices, which manufacturers are overwhelmingly likely to be outside of the United States, with the encryption enabling software and having that manufacturer associating or installing said encryption enabling software with/on the device. Supplying encryption enabling software to third party manufacturers for installation onto the electric devices at the time such electronic devices are manufactured introduces a security risk by exposing the encryption enabling software to additional parties in the manufacturing chain to be installed on devices without proper validation and authentication and limits the functionality of such electronic devices from benefiting from and facilitating various elements of public key infrastructure functionality. Sending confidential information related to the installation of encryption enabling software for installation onto electronic devices as part of the manufacture of such electronic devices often requires subjecting such confidential information to environments possessing poor security standards as compared against the standards that many companies are required to adhere based on either government regulation, industry standards, industry best practices, or corporate competition. Moreover, a third party, especially a non-domestic third party, electronic device manufacturer and its individual employees are frequently and most likely beyond the regulation of and direct oversight of the entity ordering the manufacture of the electronic devices.

BRIEF SUMMARY OF THE INVENTION

In order to solve the problems discussed above, applicants have invented an electronic device which can securely message with a requester server. The electronic device components include a microprocessor; a communications device which allows the electronic device to communicate with the requester server via a data network (including but not limited to the internet); a memory, the memory containing a program for generating a private key and a public key, the private key and public key only being generated when the electronic device is powered up by an end user, and further the private key never being transmitted outside the electronic device; the memory also containing a serial number and secret code, and further the secret code never being transmitted outside the electronic device, which uniquely identifies the electronic device; wherein upon being powered up, the electronic device verifies via the requester server, using its serial number, that it has a status reflecting pending activation and that no other device with its serial number has been activated before, and only if these conditions are satisfied will the private key be generated by the program on the electronic device, whereby the requester server generates and issues a digital certificate and sends it to the electronic device, thereby enabling the electronic device to encrypt and decrypt messaging with the requester server using its public and private keys.

The electronic device can be manufactured anywhere, including outside the United States. In one embodiment, the electronic device is a gateway for interfacing electrical load devices with the requester server for telemetry and control.

The requester server may be comprised of a root controller and coordination server, the electronic device communicating with the root controller via a secured data protocol (including but not limited to HTTPS), and the electronic device communicating with the coordination server via a secured protocol (including but not limited to XMPP).

The electronic device is assigned a unique system identifier by the requester server, and the electronic device sends the requester server a digital certificate signing request ("CSR"), its unique system identifier, and a hash combination of the unique system identifier and CSR, hashed using the secret code as a key. In one particular embodiment of the invention, the unique system identifier can be, but is not necessarily limited to be, a Jabber ID ("JID").

The digital certificate file is only sent to the electronic device if its serial number is validated, its secret code is validated, and the serial number has a status of activated in the requester server.

The digital certificate is capable of facilitating a public key infrastructure comprising of software, hardware policy and procedural elements needed to administer digital certificates and public-private key pairs, including but not limited to the ability to issue, maintain and revoke public key certificates. The digital certificate is valid only for a defined period of time, and wherein the electronic device automatically requests renewal of the digital certificate at a predefined renewal interval, which in one embodiment can be one year.

The invention may also take the form of a system for the secure distribution of digital certificates for electronic devices manufactured by a third party, including a requester server; an electronic device manufactured using a third party, with a unique serial number and secret code installed on the electronic device, along with a software system image; the electronic device, once powered up and connected to a data network (including but not limited to the internet), the software system image configured to:

initiate a digital certificate enrollment process which causes the electronic device to generate a private key, a public key, and a digital certificate signing request ("CSR");

send a hashed version of the CSR to the requester server, using the secret code as a key;

the requester server generating a certificate file and sends it to the electronic device, and storing the public key and private key in a memory of the electronic device, thereby enabling the electronic device to encrypt and decrypt messaging with the root controller, using its public and private keys and benefit from and facilitate a public key infrastructure.

The invention may also include a method for authenticating electronic devices for the secure distribution of digital certificates for electronic devices manufactured by a third party, comprising the steps of:

manufacturing an electronic device using a third party, and installing a unique serial number and secret code on the electronic device, along with a software system image;

an end user powering on the electronic device after it has been sold;

setting up data network access (including but not limited to the Public Internet) for the electronic device and an account with a requester server;

initiating a certificate enrollment process which causes the electronic device to generate a private key, a public key, and a CSR;

sending a hashed version of the CSR to the requester server, using the secret code as a key;

a digital certificate file is generated and sent to the electronic device, and storing the public key and private key in a memory of the electronic device, thereby enabling the electronic device to encrypt and decrypt messaging with the root controller, using its public and private keys and benefit from and facilitate a public key infrastructure.

The invention may also include a method for authenticating electronic devices. The requester server contains a device status table with the serial number, associated secret code and status of each electronic device, and wherein the status is updated throughout the manufacturing, distribution, sale and activation process. After an order is placed each electronic device in the order is updated to "manufacture pending". After the electronic device(s) are shipped to the distributor, the status for each device shipped is set to "manufactured". After the electronic device(s) are sold and shipped, the status of each device is updated to "pending activation". After the end user has created a user account, and gone through device network setup, and logged into the coordination server using its JID, the device status is updated to "activated". Only with an activated device, listed with an activated status, a valid hashed CSR and serial number value, and a valid serial number can an electronic device be authenticated and a digital certificate be issued. The requester server initiates a digital certificate enrollment process which causes the electronic device to generate a private key, a public key, and a CSR. The electronic device sends a hashed version of the CSR to the requester server, using the secret code as a key. A digital certificate file is generated and sent to the electronic device, and the electronic device stores the public key and private key in its internal memory. Now the electronic device is configured to encrypt and decrypt messaging with the requester root controller, using its public and private keys. The electronic device also benefits from and facilitates a public key infrastructure.

While the invention will be applicable to any electronic device which requires secure messaging, one embodiment electronic device is the gateway described in Application No. 61/793,156 filed Mar. 15, 2013, the entire contents of which are hereby incorporated by reference.

The details of one or more aspects of the disclosure are set forth in the accompanying drawings and the description below. Other features, objects, and advantages will be apparent from the description and drawings, and from the claims.

DETAILED DESCRIPTION DETAILED DESCRIPTION OF THE INVENTION

Figure 1A:
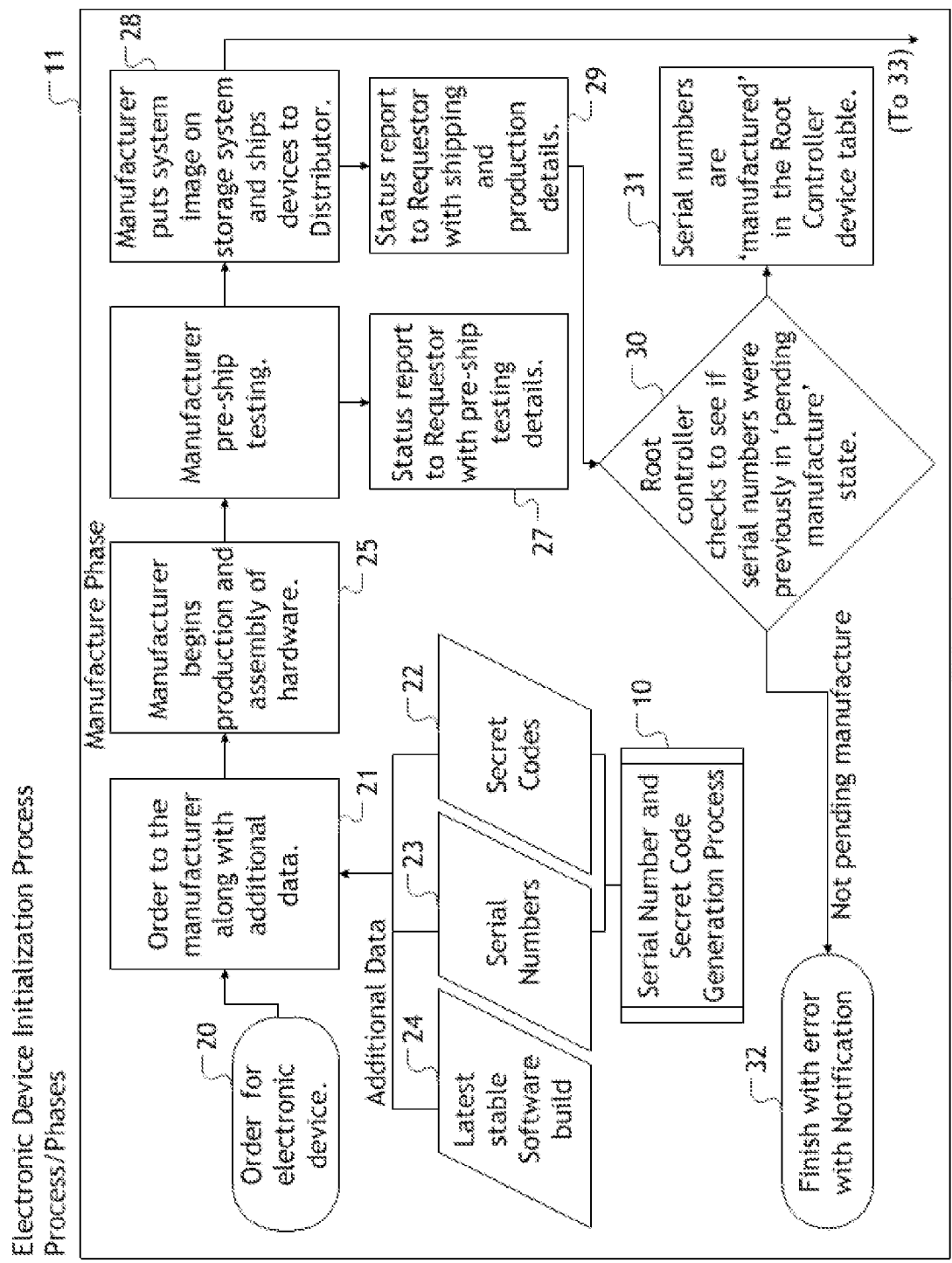
FIG. 1 is a block diagram illustrating the different phases of the electronic device initialization process.
Figure 1B:
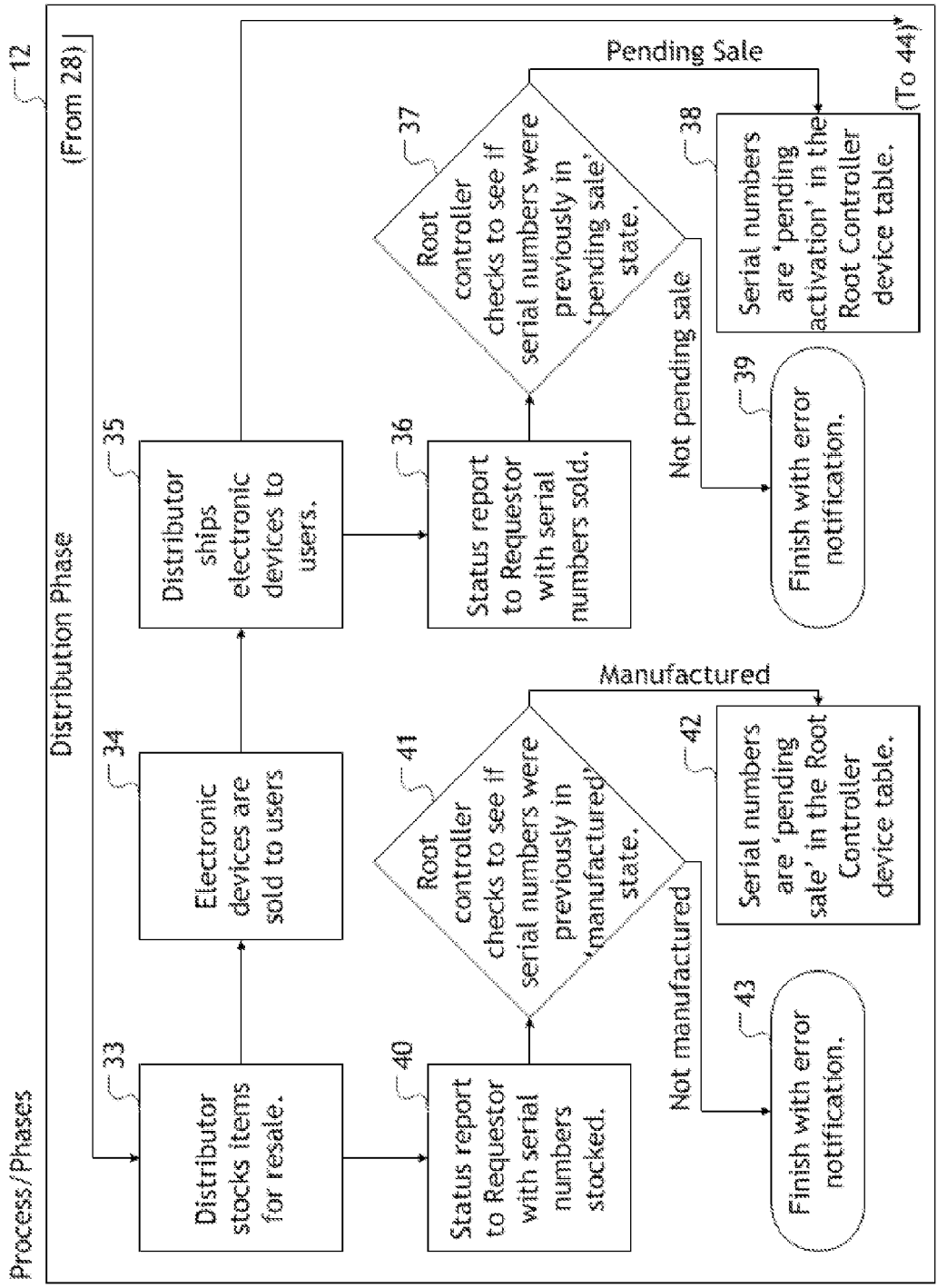
Figure 1C:
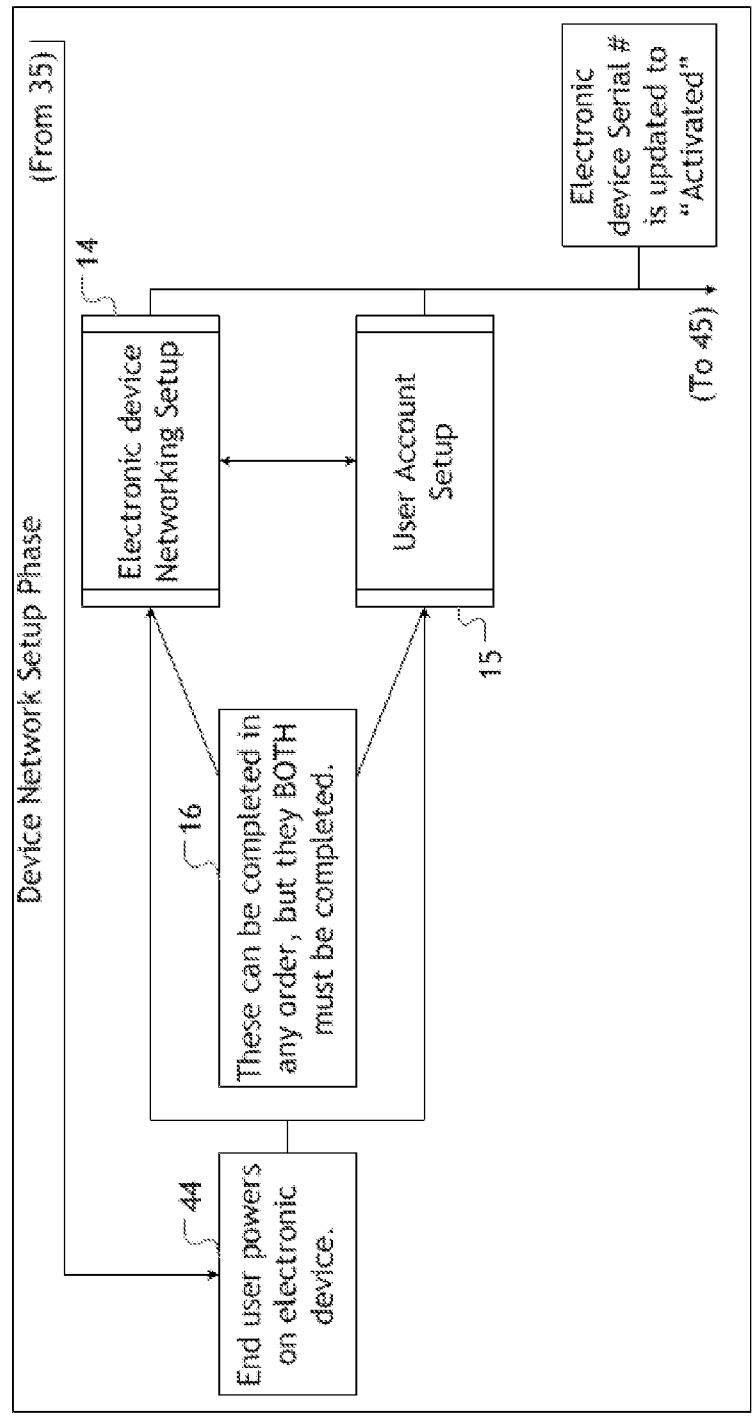
Figure 1D:
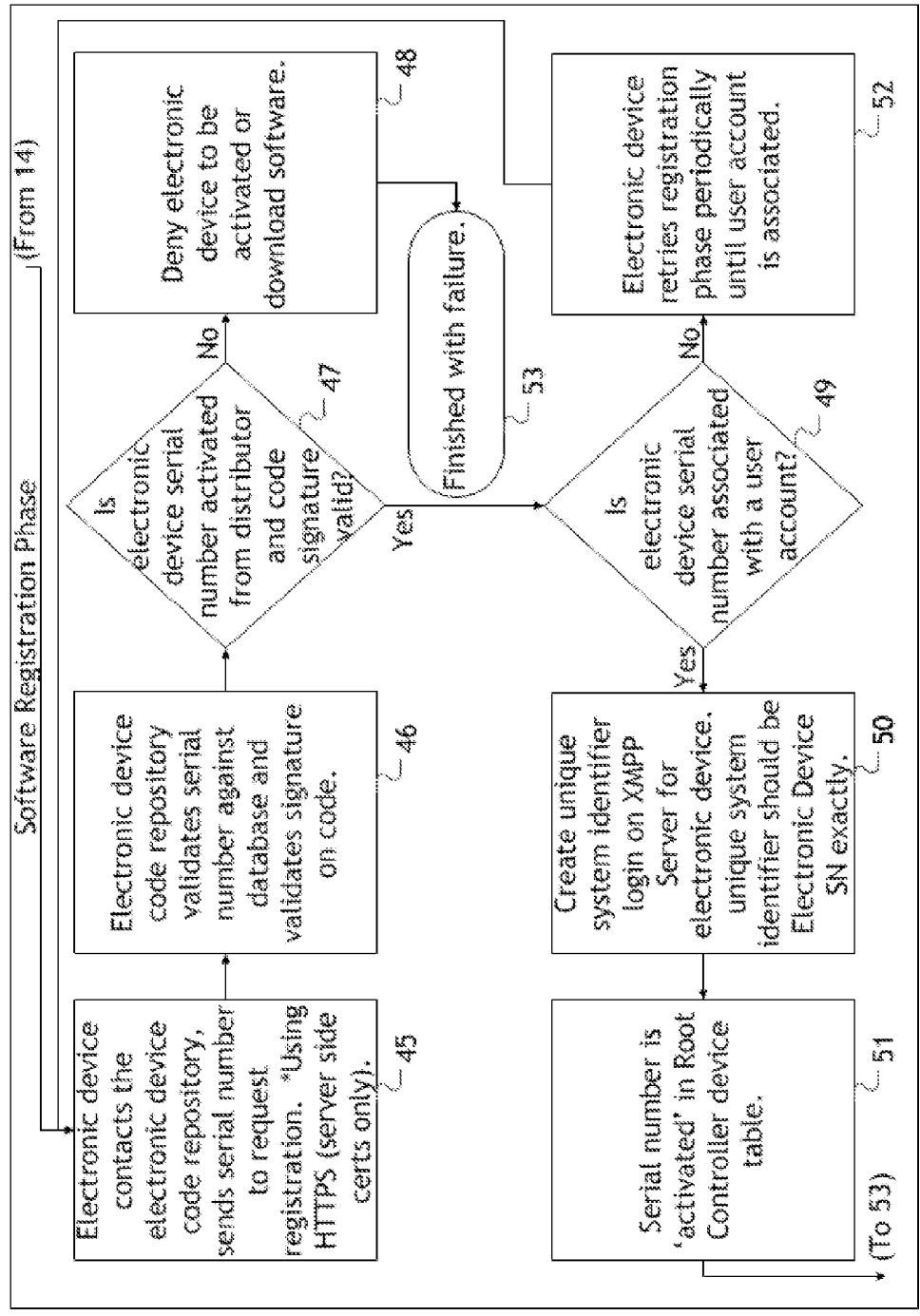
Figure 1E:
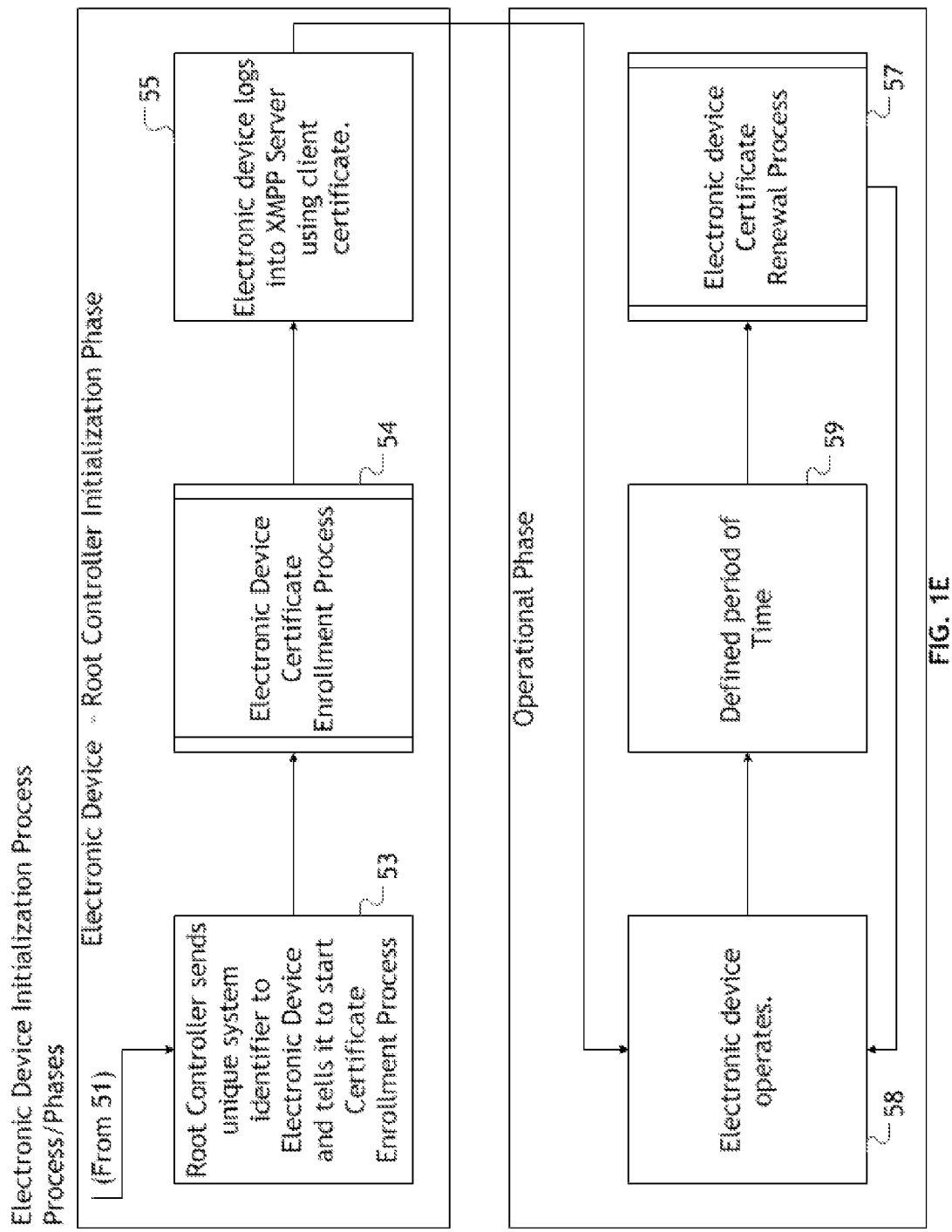

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The current invention solves the problem of exposing sensitive, confidential, and potentially exploitable information on encryption enabling software to multiple parties outside of the regulation and direct oversight of an entity requesting the manufacture of electronic devices to be secured with encryption enabling software capable of facilitating Public Key Infrastructure functionality. The invention also solves the problems associated with the installation of encryption enabling software during the manufacture of electronic devices, namely, utilization of the methods and process of the current invention allow electronic devices to benefit from and facilitate a public key infrastructure, which comprises of software, hardware, policy and procedural elements used to administer digital certificates and public-private key pairs, including the ability to issue, maintain, and revoke public key certificates. The process begins in the manufacture phase 11 (see FIG. 1) with the generation of secret codes 22 and serial numbers 23 utilizing a serial number and secret code generation process 10 (see FIG. 2).

Figure 2:
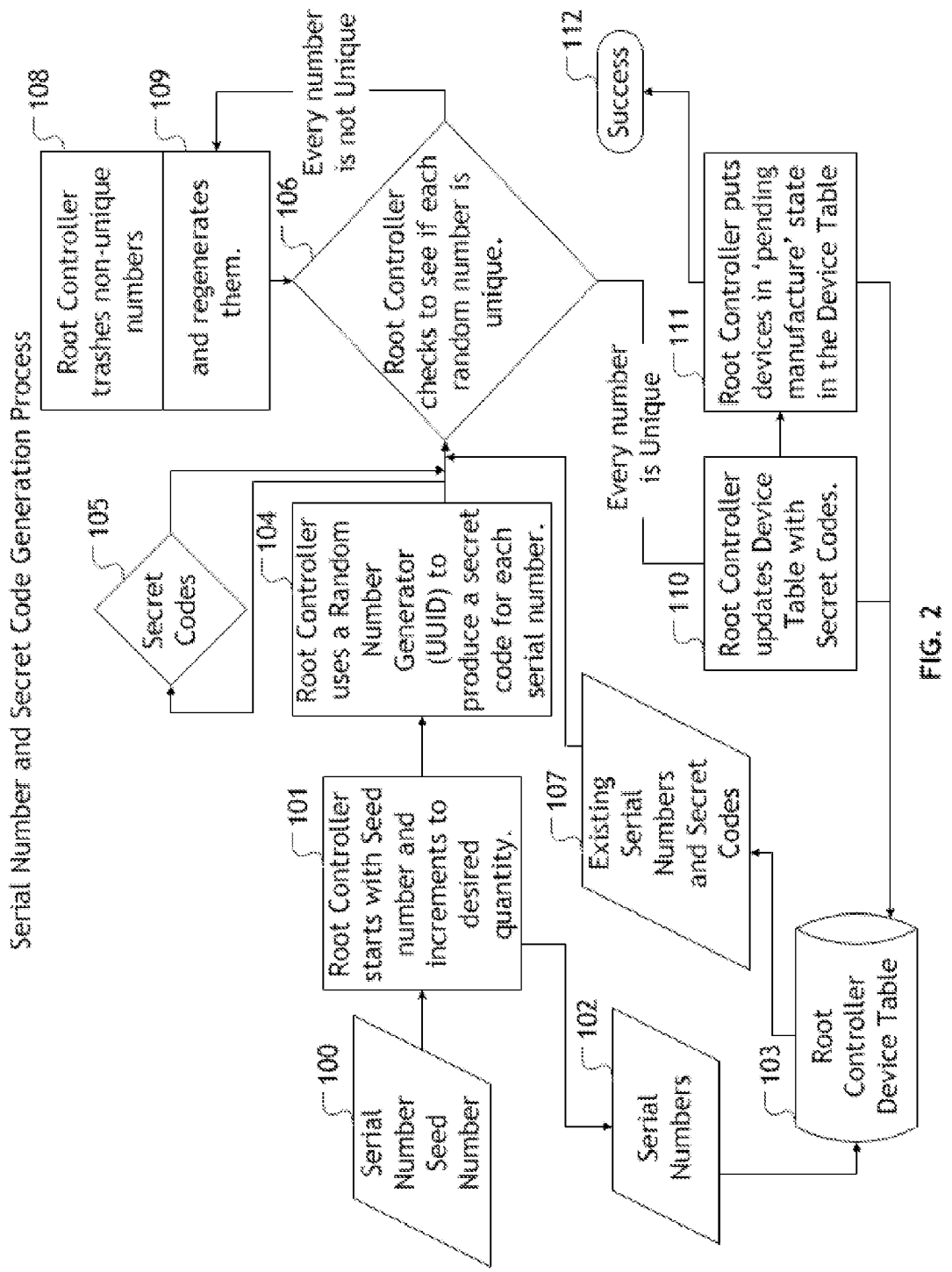
FIG. 2 is a block diagram illustrating the serial number and secret code generation process.

Referring now to FIG. 2, in one embodiment of the serial number and secret code generation process 10, the ENTITY (referred to in the Figures as "Requestor") submits a serial number seed number to a Root Controller. In a particular embodiment, the root controller is an interface comprised of mechanical devices and software designed to oversee certain portions of the current invention, such portions comprised of: the direction and interpretation of communications among the electronic devices and the ENTITY's data center; authentication and authorization of all electronic devices, users, and computers within ENTITY's electronic device network; modification of data tables; assignment and enforcement of security policies for all computers; and installation or update of software builds. The Root Controller creates the number of serial numbers 102 requested by incrementing the starting serial number seed number 100 until the desired quantity of serial numbers 102 has been produced 101. This results in a set of incrementally increased serial numbers 102. The Root Controller then saves the serial numbers to the root controller device table 103. The root controller device table 103 is a database table comprised of lists of electronic device serial numbers 102 and any corresponding information related to the electronic device bearing such serial number 102, such as but not necessarily limited to, secret code 105 and electronic device state status. In one embodiment of the invention, the data contained within the root controller device table 103 as updated through the process can be utilized to authenticate electronic device. Such an embodiment could be used to authenticate various conditions or statuses of the device including, but not limited to: pending manufacture, manufactured, manufacturing origin, pending shipping, shipped, pending sale, pending installation, installed, pending activation, activated, pending registration, registered, renewal, hardware upgrade, software upgrade.

In conjunction with the creation of incrementally increased serial numbers 102, the root controller uses a random number generator to produce a secret code 105 for each serial number 102 requested 101. In one embodiment, a Universal Unique Identifier is used to create the secret code 105.

Existing serial numbers 102 and secret codes 105 stored within the root controller device table 103 are made available 107 in order for the root controller to perform a validation 106 to determine whether each newly created random number is unique. The secret codes 105 newly generated by the random number generator 104 are compared against the existing serial numbers and corresponding secret codes already listed within the root controller device table 103. In one embodiment, secret codes 105 may comprise strings of data at least, but not limited to 32 hexadecimal digits of randomly generated data, however, such length of numbers of characters may be extended from time to time as industry standards or security requirements change.

If each secret code 105 is not unique, the fail condition, the root controller removes the non-unique secret codes 108 and produces new ones 109 using a random number generator. After producing new secret codes 105 the root controller repeats the uniqueness validation 106 to determine whether each secret code 105 is unique. The same pass fail conditions and actions of the first check apply to subsequent checks. If each secret code 105 is validated as unique, the pass condition, the root controller updates the root controller device table 103 with the secret codes 105.

As secret codes 105 are validated as unique 106, the root controller updates 110 the root controller device table 103 with such secret codes 105; ensuring that each serial number 102 has a corresponding secret code 105. The root controller then updates 111 the appropriate serial numbers 102 within the root controller device table 103 to reflect a status of "PENDING MANUFACTURE". Upon each newly created serial number 102 being updated to both correspond with a newly generated secret code 105 and reflect a PENDING MANUFACTURE 111 state within the root controller device table 103, the serial number and secret code generation process successfully completes 112 with serial numbers 23 and secret codes 22 ready for submission of a manufacturing request 20.

Following the pre-generation of secret codes 22 and serial numbers 23, an order for the manufacture of electronic devices 20 can be placed with a manufacturer capable of manufacturing the specific electronic devices. The request 21 for the manufacture of electronic devices is sent to a manufacturer via one of many electronic communication methods, including but not limited to [HTTPS or SMTP]. This request 21 for the manufacture of electronic devices is sent along with a list of potentially comprising serial numbers 23, secret codes 22, and the latest software build to be used on the electronic devices 24. The data payload of this electronic communication should be protected by encryption.

Once the request 21 is received, the manufacturer begins production and assembly of the electronic devices 25. The manufacture and assembly by the manufacturer should comprise of many steps, including by not limited to any software installation of serial numbers 23, secret codes 22, and the latest software build to be used on the electronic devices 24. At minimum, each device will be electronically identifiable by a unique serial number 23 and secret code 22. In one particular embodiment of the present invention, upon completion of the assembly of any number of the requested 21 electronic devices, the manufacturer may perform pre-ship testing for quality purposes 26 and may send a status report to the ENTITY comprised of pre-ship testing results 27. Upon completion of any pre-ship testing 26, the manufacturer places the latest software build to be used on the electronic devices 24 and may ship the electronic devices to a distributor 28, initiating the distribution phase 12.

Upon shipping to distributor 28, manufacturer may, in a particular embodiment, send a status report to ENTITY with shipping and production details 29, comprising of serial numbers 23. Shipping and production details status reports 29 are optimally sent via HTTPS or SMTP. The data payload of this electronic communication should be protected by encryption. Upon receipt of shipping and production details status reports 29, ENTITY compares 30 provided serial numbers 23 to verify whether or not each serial number 23 in the shipping and production details status reports 29 was previously listed in the root controller device table 103 to reflect a status of a PENDING MANUFACTURE state. If any serial number 23 was not previously listed in a status reflecting PENDING MANUFACTURE state, then ENTITY can note an error and follow up any potential discrepancy for security concern 32. If the serial numbers 23 were previously listed in a status reflecting PENDING MANUFACTURE state, then ENTITY modifies status associated with the serial numbers 23 of the manufactured electronic devices in the root controller device table 103 to reflect a status of MANUFACTURED 31.

Upon receipt of the manufactured electronic devices, a distributor may stock the electronic devices for sale 33 and may send a stocking status report 40 to ENTITY with serial numbers 23 that have been stocked. Upon receipt of stocking status reports 40, ENTITY compares 41 provided serial numbers 23 to verify whether or not each serial number 23 in the stocking status reports 40 was previously listed in the root controller device table 103 with a status reflecting MANUFACTURED state. If any serial number 23 was not previously listed in a status reflecting MANUFACTURED state, then ENTITY can note an error and follow up any potential discrepancy for security concern 43. If the serial numbers 23 were previously listed in a status reflecting MANUFACTURED state, then ENTITY modifies status associated with the serial numbers 23 of the manufactured electronic devices in the root controller device table 103 to reflect a status of PENDING SALE 42.

The electronic devices are sold 34 by the distributor to an entity and then shipped or otherwise delivered 35 to customer end users to end the distribution phase 12. Upon shipment or other delivery to customer end user 35, distributor may send a sold status report 36 to ENTITY with serial numbers 23 of electronic devices that have been sold to customers. Upon receipt of sold status reports 36, ENTITY compares 37 provided serial numbers 23 to verify whether or not each serial number 23 in the sold status reports 36 was previously listed in the root controller device table 103 with a status reflecting PENDING SALE state. If any serial number 23 was not previously listed in a status reflecting PENDING SALE state, then ENTITY can note an error and follow up any potential discrepancy for security concern 39. If the serial numbers 23 were previously listed in a status reflecting PENDING SALE state, then ENTITY modifies status associated with the serial numbers 23 of the manufactured electronic devices in the root controller device table 103 to a status reflecting PENDING ACTIVATION 38.

Referring now to FIG. 1, in one particular embodiment, the Device Network Setup Phase 13 begins upon a customer's receipt of the electronic device. The customer powers up an electronic device 44 and performs both user account setup 15 (see FIG. 4) and network setup (see FIG. 3) for the electronic device 14. Both user account setup 15 and network setup for the electronic device 14 must occur prior to registration of the electronic device 16. The user can complete the networking setup 13 for the electronic device in any number of methods.

Figure 3A:
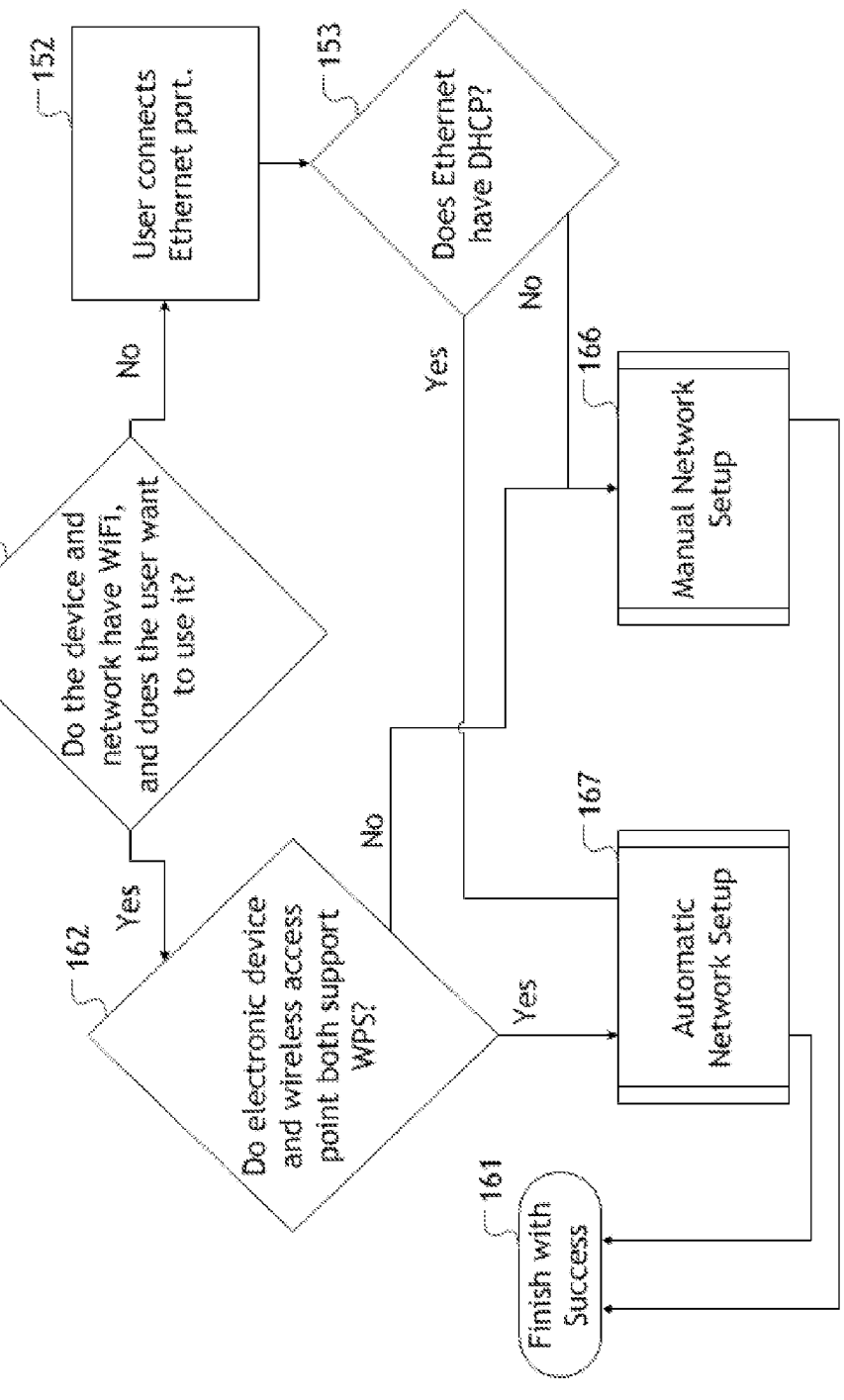
FIG. 3 is a block diagram illustrating the gateway networking setup process.
Figure 3B:
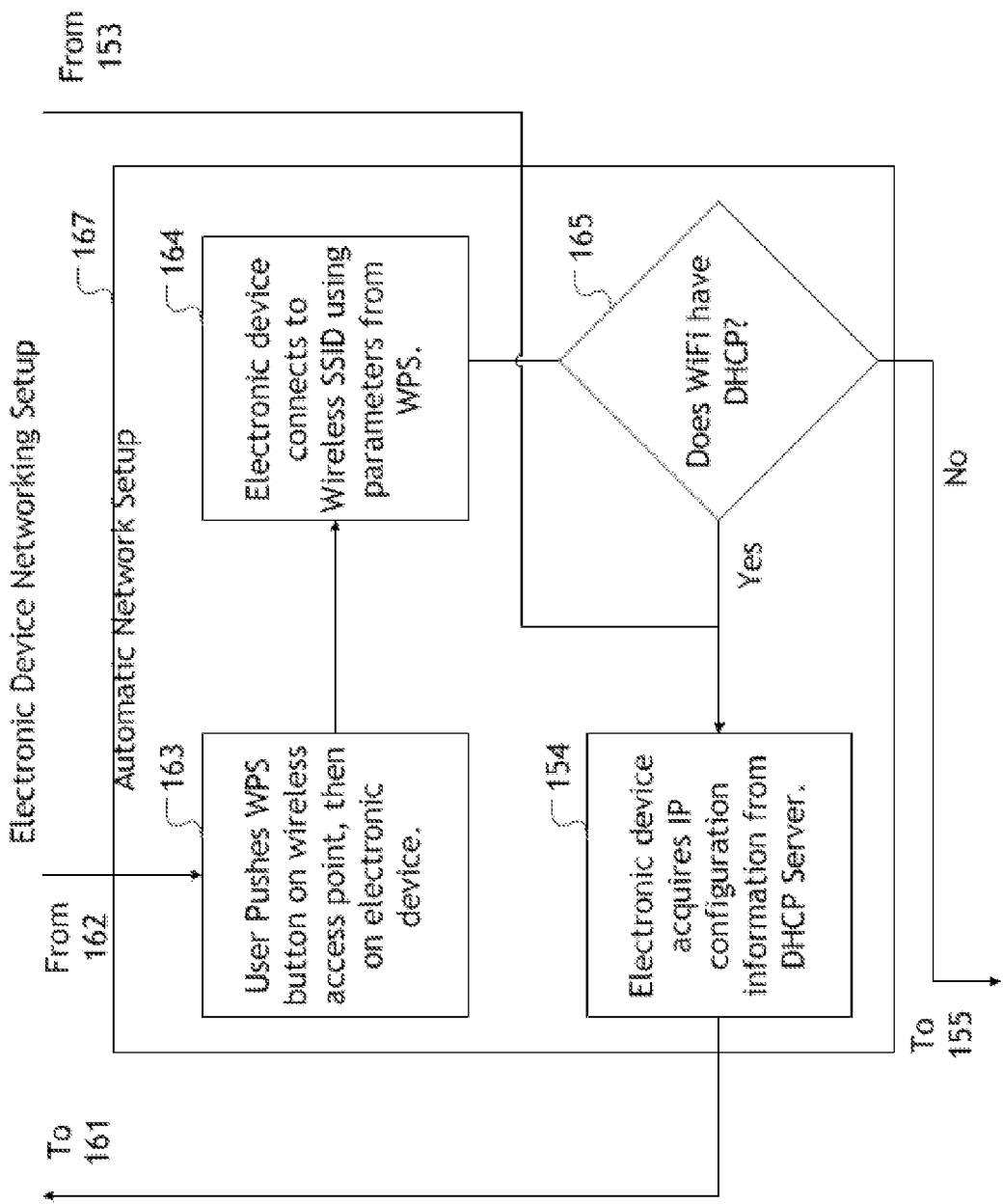
Figure 3C:
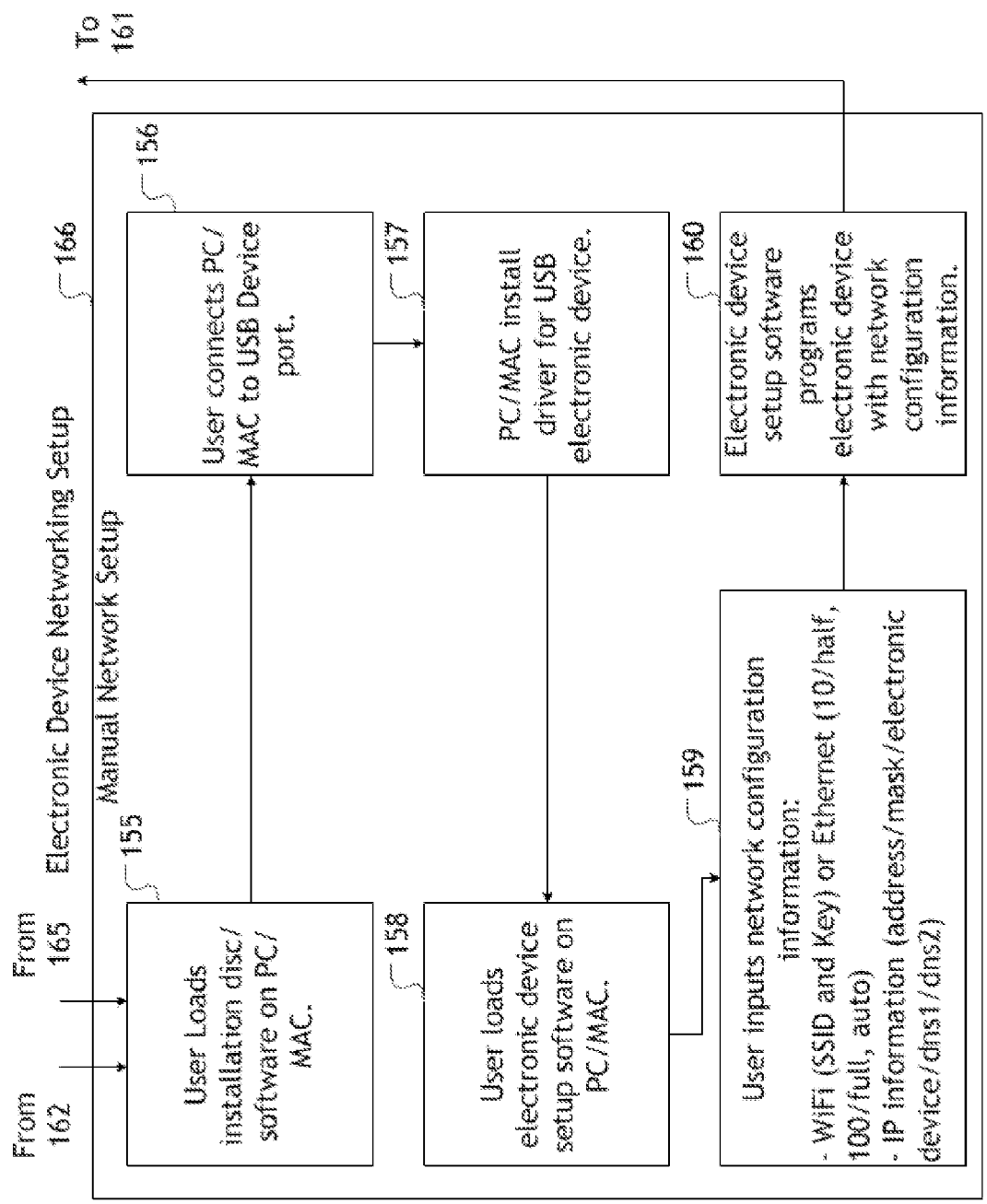

Referring now to FIG. 3, in one embodiment of this process relating to an electronic gateway device, the networking setup 14 can be accomplished as follows. A determination 151 is made of whether the device and network have WiFi connectivity to the internet, and if so, whether the user prefers to use WiFi to connect to the internet.

If the user determines that either the device or network does not have WiFi connectivity to the internet, or the user prefers not to use WiFi to connect to the internet, the user must connect the device to an Ethernet Port 152. A decision is made whether or not the Ethernet port 152 is enabled with Dynamic Host Configuration Protocol ("DHCP") 153. If the Ethernet Port 152 has DHCP, then the gateway device proceeds to follow the Automated Network Setup, 167, and acquires an IP configuration information from the DHCP server 154 and the network configuration process finishes with success 160. If the Ethernet Port 152 does not have DHCP, then the Manual Network setup 166 is followed with the user loading software onto the user's computer 155. The user may connect the computer to port, such as but not limited to a USB device port, on the gateway device 156, the computer may then install a driver for the gateway device 157 via the port connection. The user loads any gateway device setup software onto the computer 158, and the user inputs network configuration information comprising: WiFi (SSID and Key) or Ethernet (10/half, 100/full, auto) and IP information (address/mask/gateway/dns1/dns2) 159. The Gateway setup software programs gateway device with network configuration information 160. Upon the gateway setup software completing the programming of the gateway device with network configuration information 160, the network configuration process finishes with success 160.

If the user determines that device or network does have WiFi connectivity to the internet and the user prefers to use WiFi to connect to the internet 151, a decision is made whether or not the gateway device and WiFi access point both support WiFi Protected Setup ("WPS") 162. If the gateway device and WiFi access point both support WPS, then the gateway device proceeds to follow the Automated Network Setup, 167, and activates WPS on both the WiFi access point and the gateway device 163. The gateway device then connects to a wireless SSID using parameters from the WPS 164. A decision is made whether or not the wireless SSID 164 is enabled with DHCP 165. If the wireless SSID 164 has DHCP, then the gateway device continues to follow the Automated Network Setup, 167, and acquires an IP configuration information from the DHCP server 154 and the network configuration process finishes with success 160. If the wireless SSID 164 does not have DHCP, then the Manual Network setup 166 is followed with the user loading software onto the user's computer 155. The user may connect the computer to port, such as but not limited to a USB device port, on the gateway device 156, the computer may then install a driver for the gateway device 157 via the port connection. The user loads any gateway device setup software onto the computer 158, and the user inputs network configuration information comprising: WiFi (SSID and Key) or Ethernet (10/half, 100/full, auto) and IP information (address/mask/gateway/dns1/dns2) 159. The Gateway setup software programs gateway device with network configuration information 160. Upon the gateway setup software completing the programming of the gateway device with network configuration information 160, the network configuration process finishes with success 160.

Figure 4:
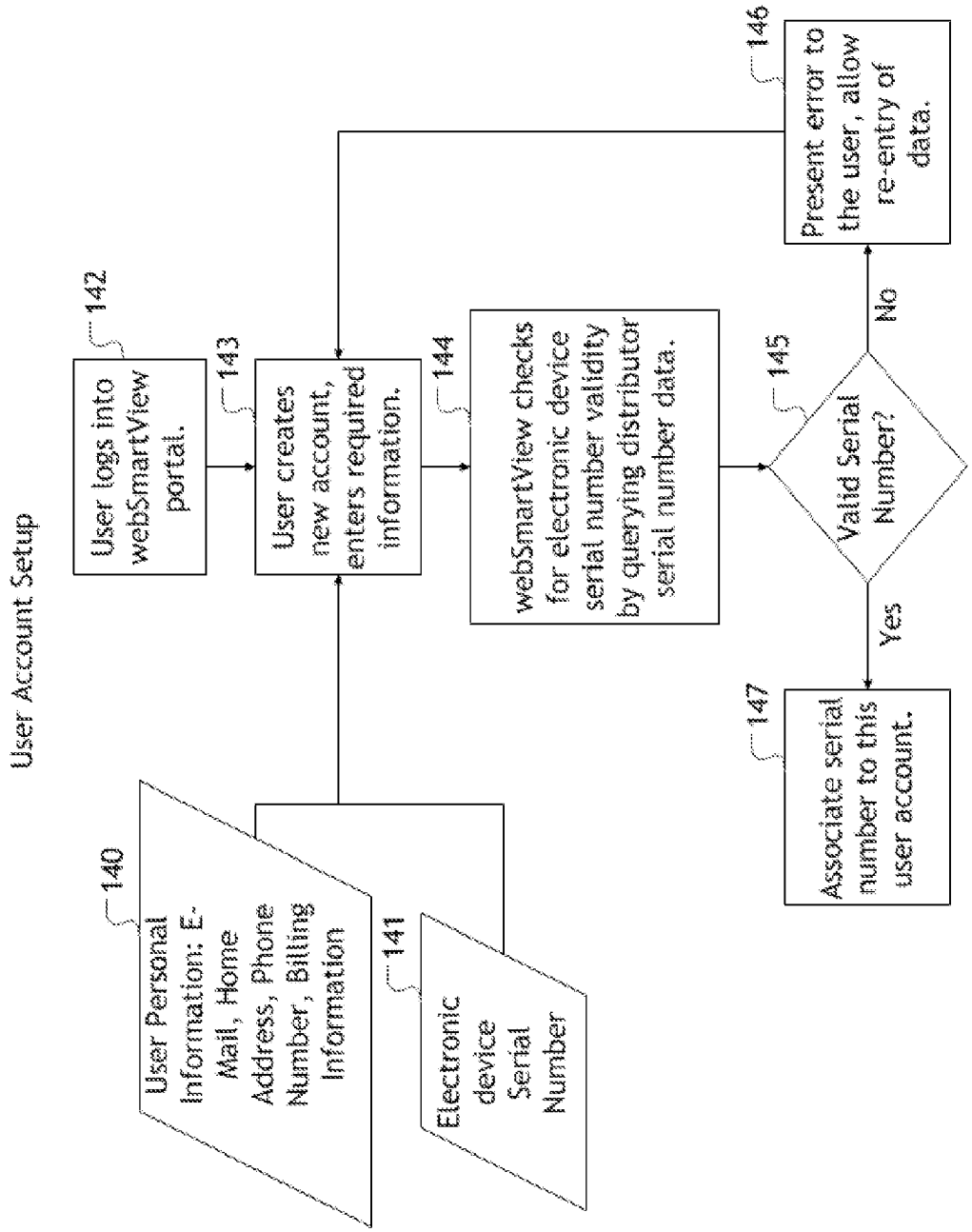
FIG. 4 is a block diagram illustrating the user account setup process.
Figure 5A:
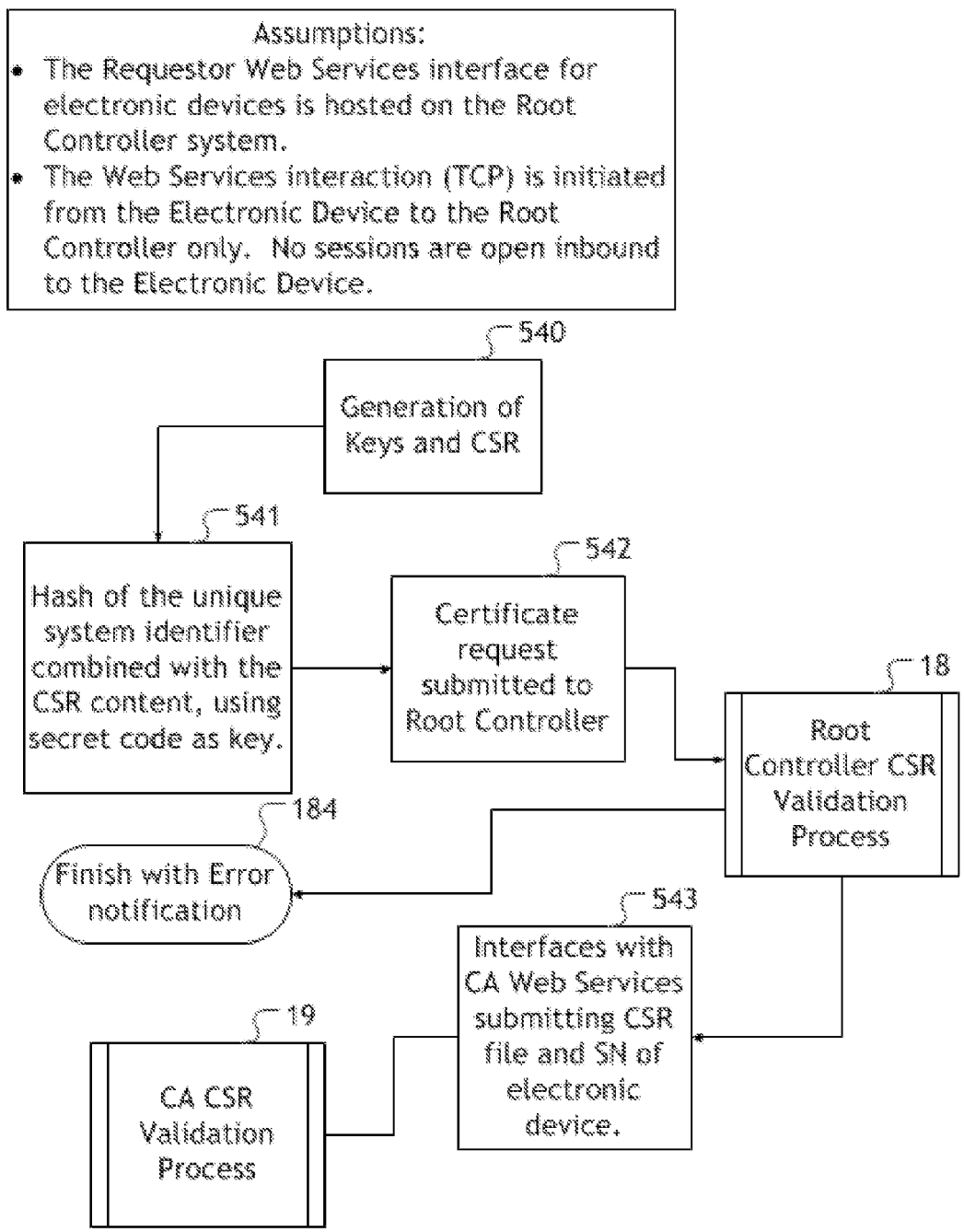
FIG. 5 is a block diagram illustrating the electronic device certificate enrollment process.
Figure 5B:
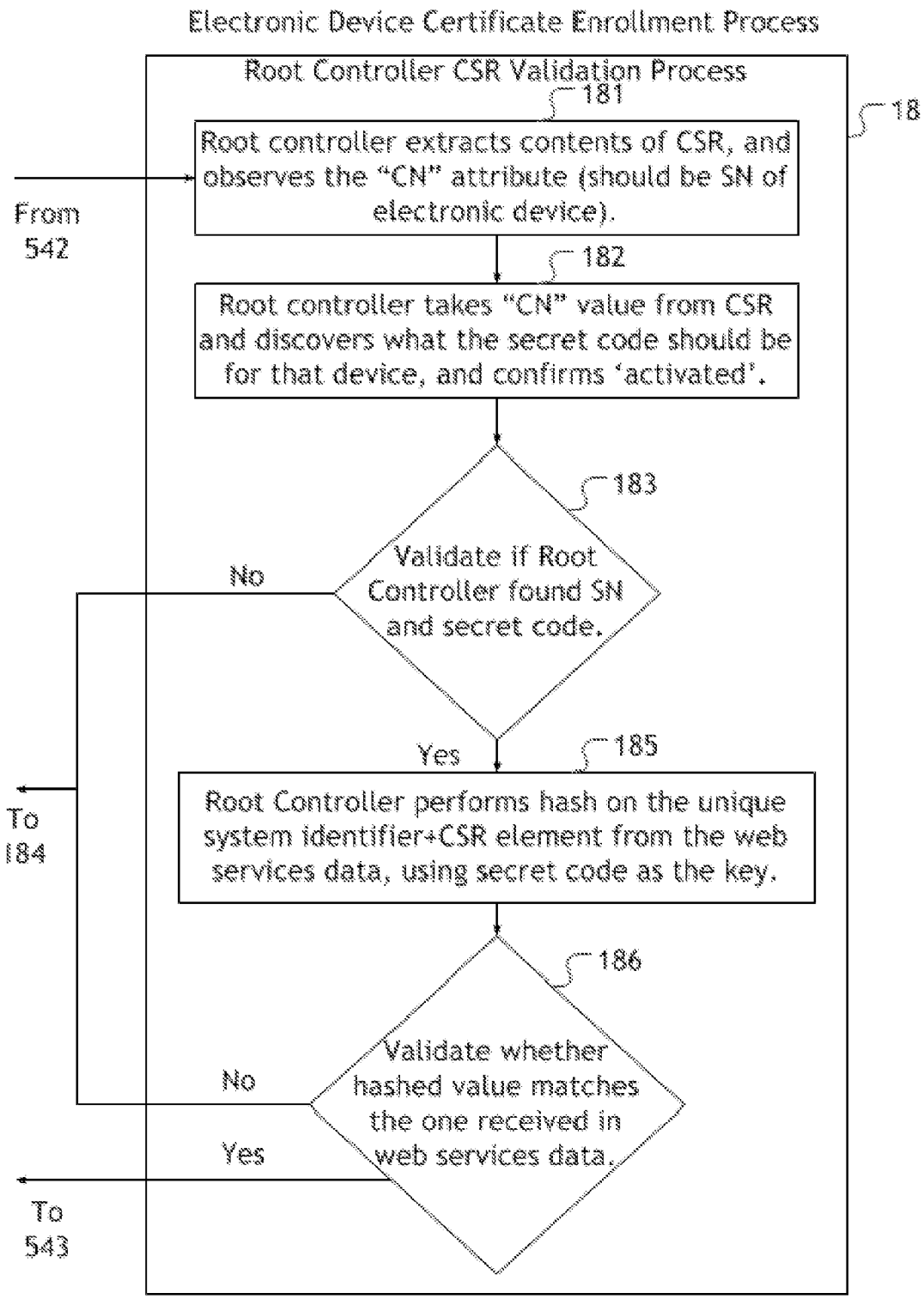
Figure 5C:
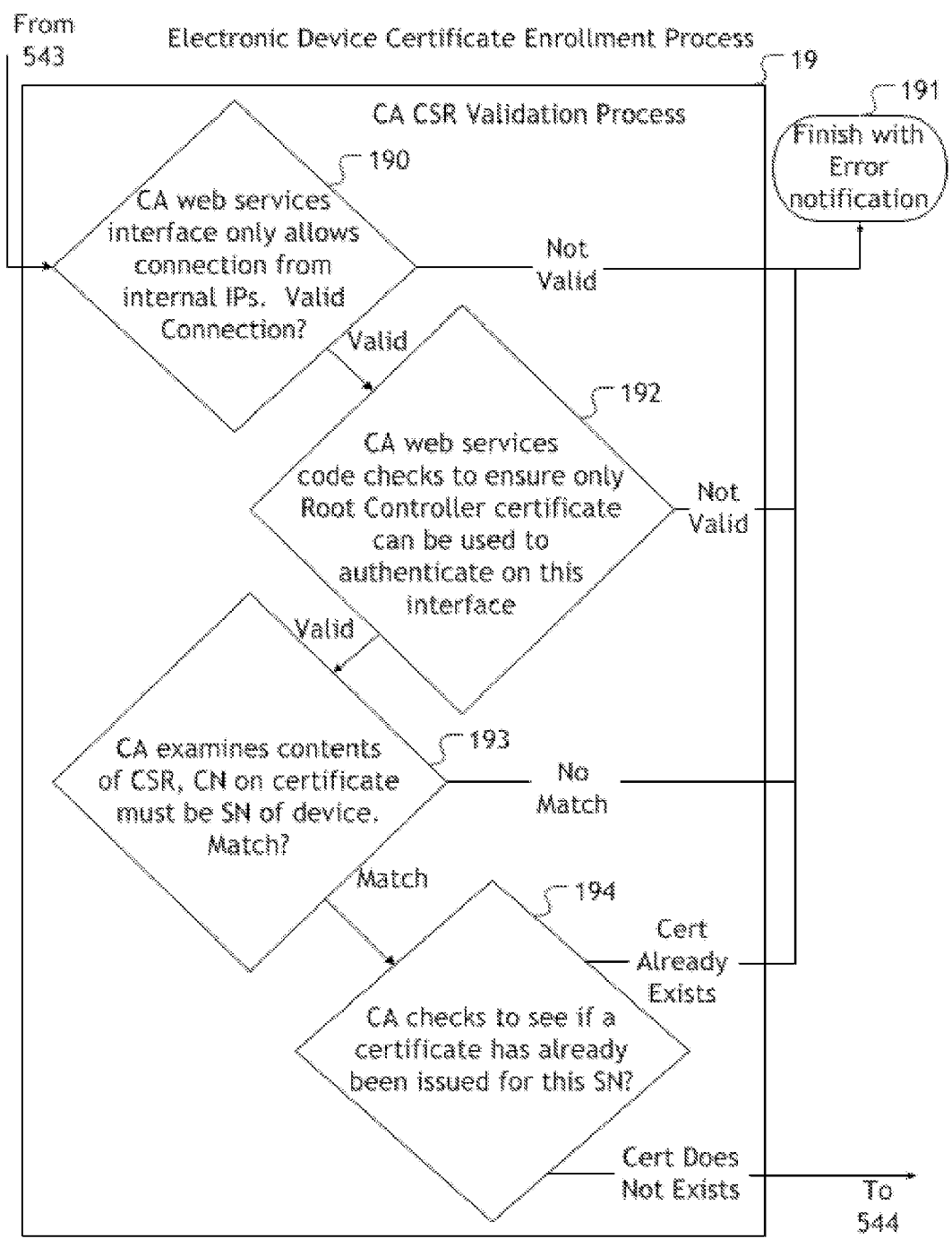
Figure 5D:
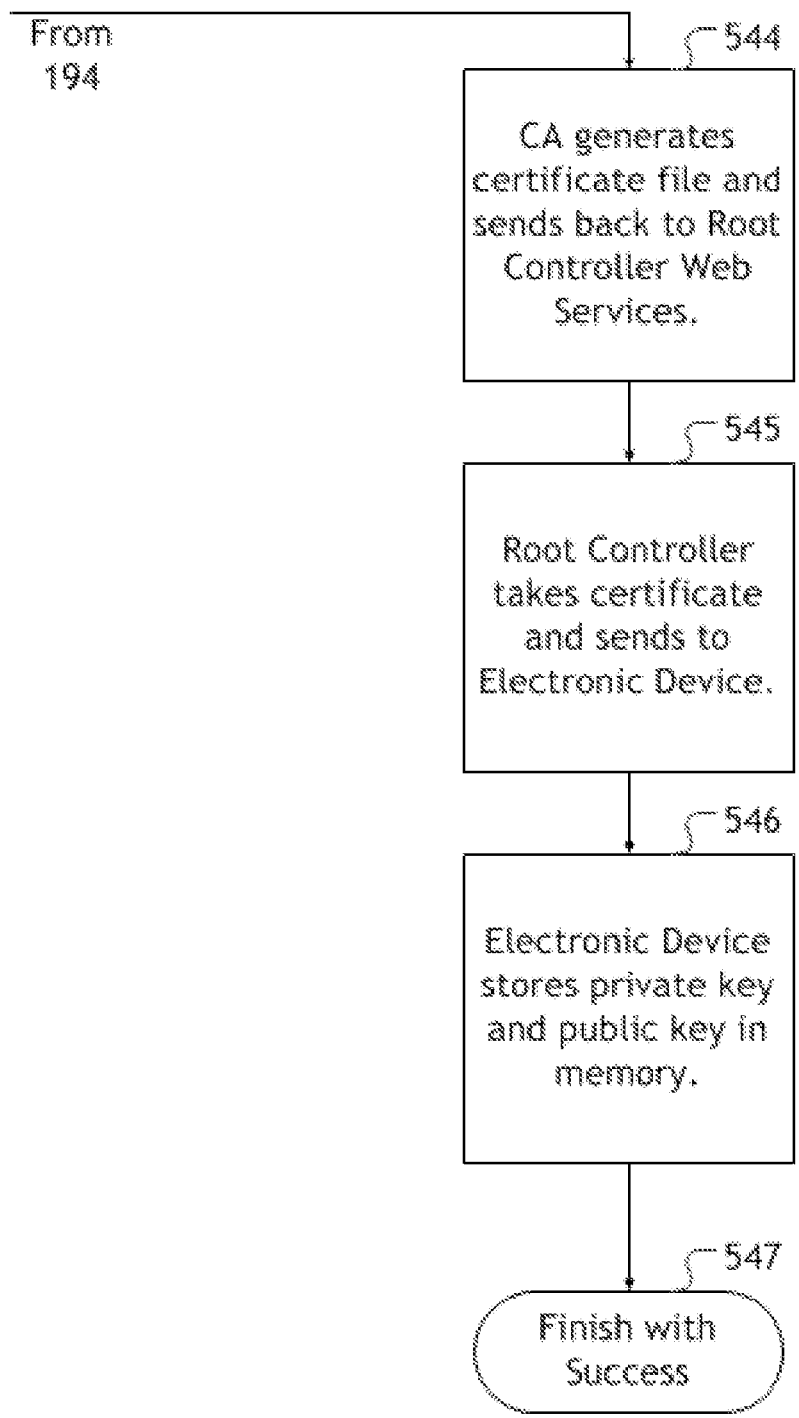
Figure 6A:
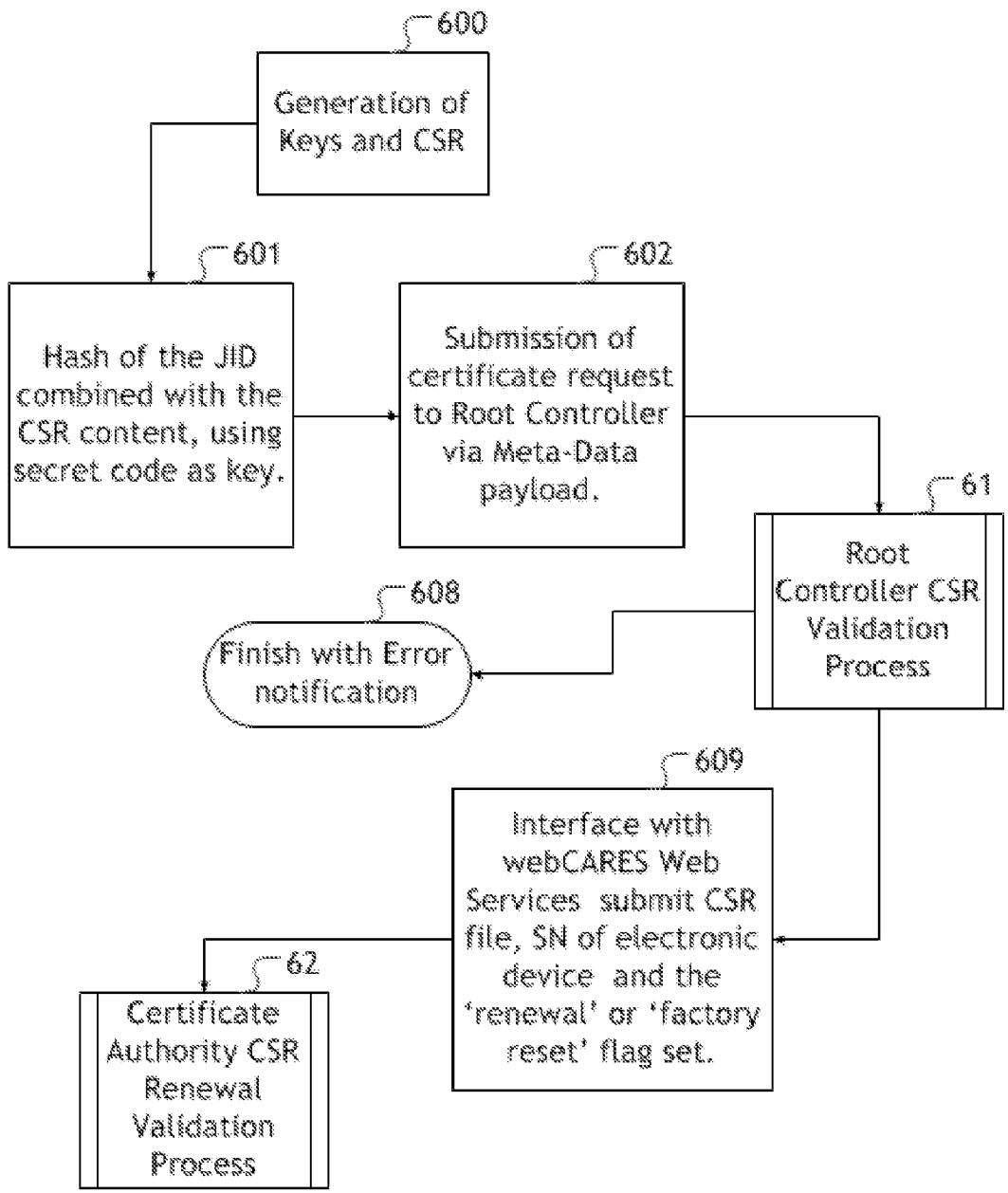
FIG. 6 is a block diagram illustrating the electronic device certificate renewal process.
Figure 6B:
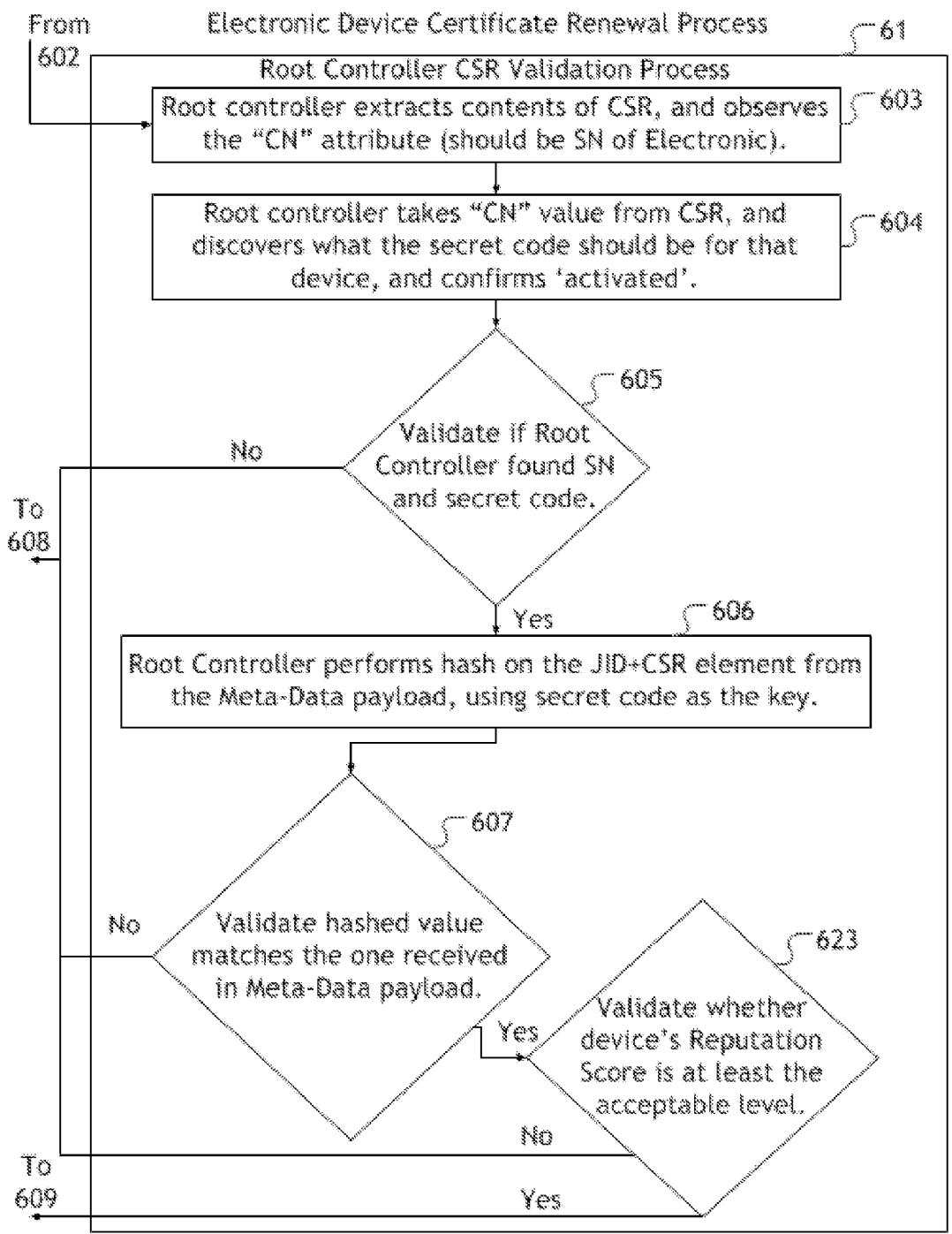
Figure 6C:
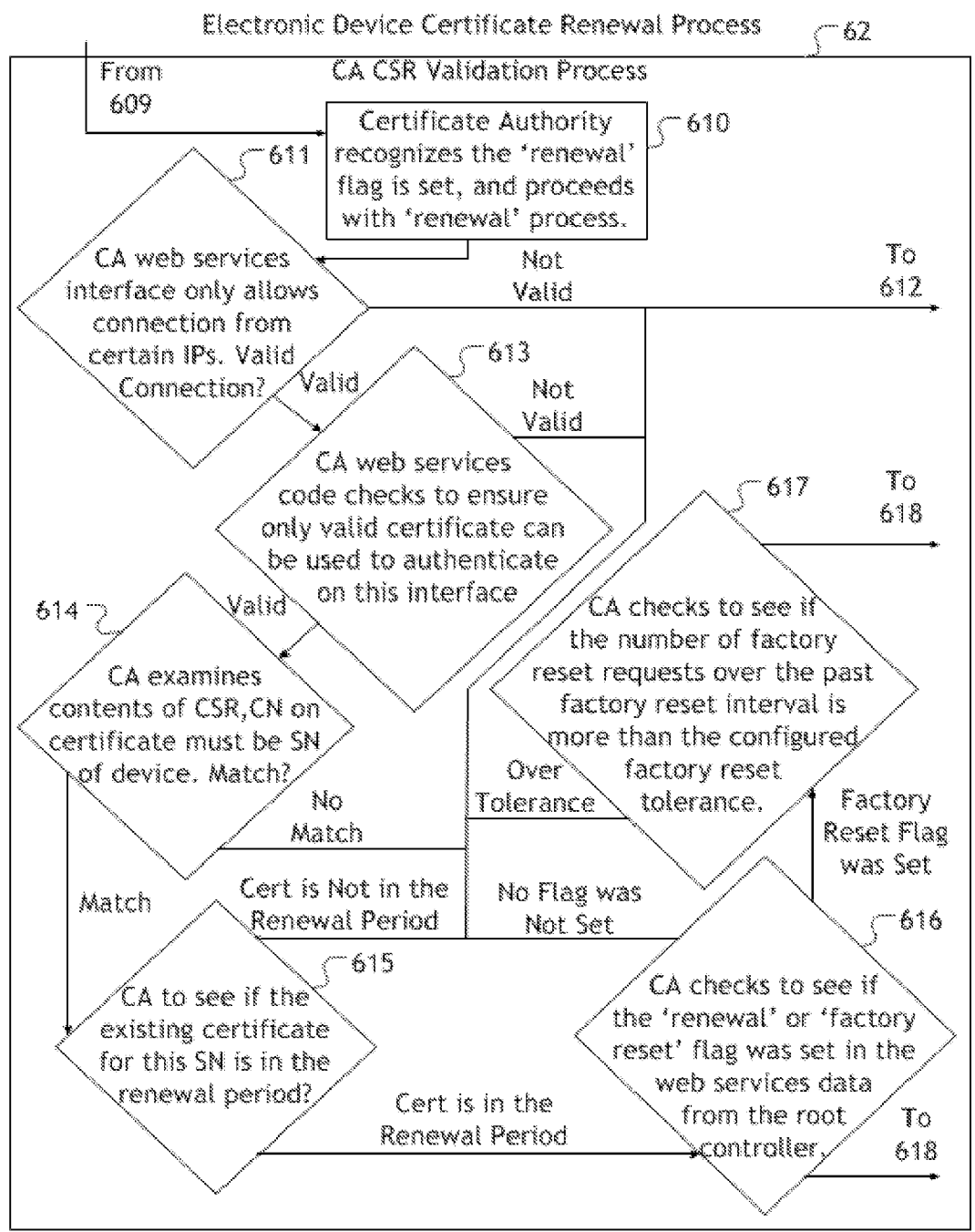
Figure 6D:
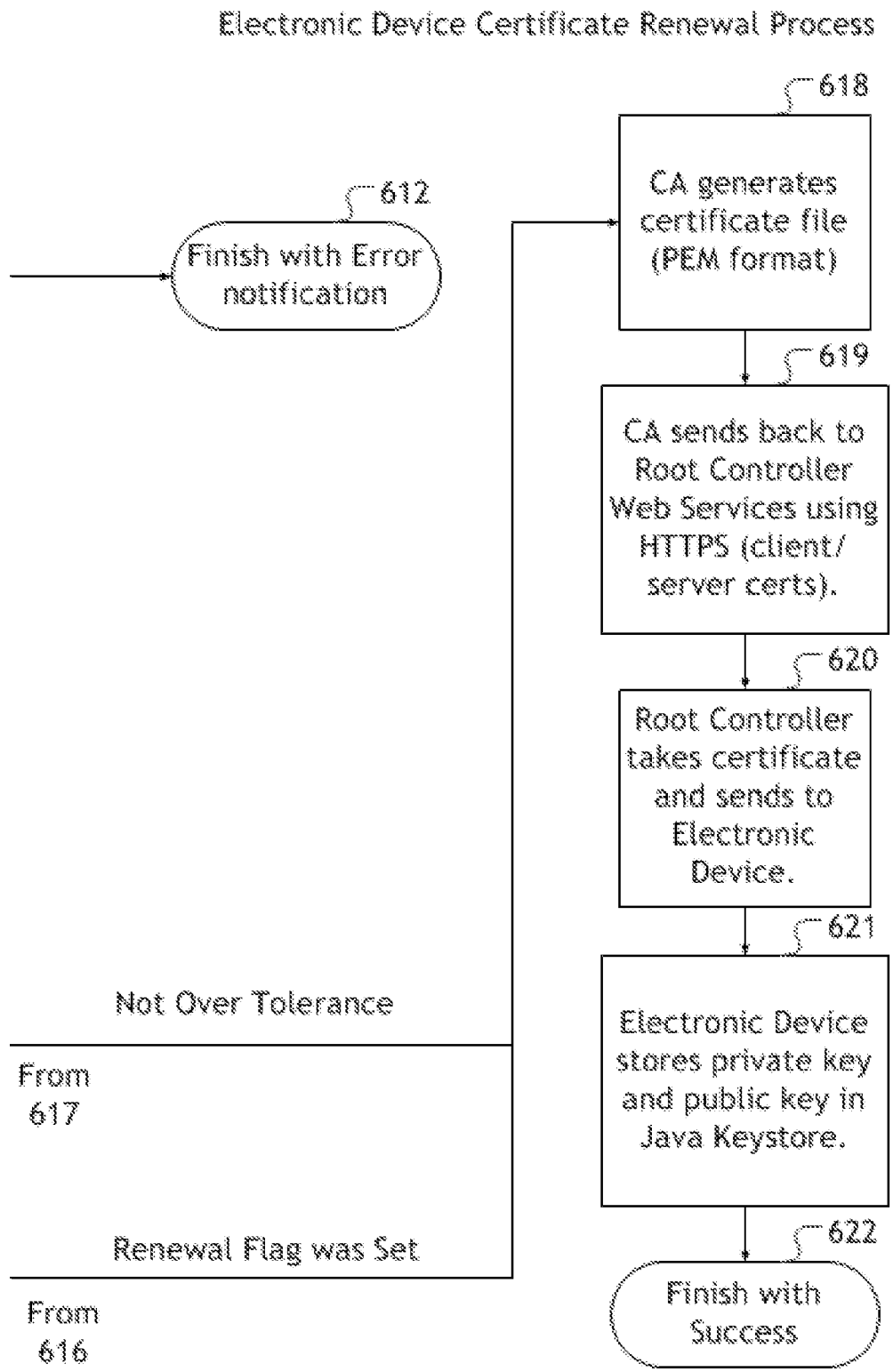

Referring now to FIG. 4, in one embodiment of this process relating to an electronic gateway device, the user account setup 14 can be accomplished as follows. A user with certain personal information 140, comprising but not limited to, e-mail address, home address, phone number, and billing information along with the serial number 23 of gateway device 141, logs into a customer user account website portal 142. The user creates a new account by entering required information 143 as required from the customer user account website portal 142. The customer user account website portal 142 checks for gateway device serial number validity by querying serial number data 144 from table 103 root controller device and performs a serial number validation check 145. If the serial number validation check 145 does not find a valid serial number 23, an error is presented to the user, allowing for the re-entry of data and/or providing user assistance contact information 146. If the serial number validation check 145 does find a valid serial number 23, the user account set up completes and associates the serial number 23 of the gateway device to the user account created 147.

Upon successful completion of both the user account setup 15 and network setup for the electronic device 14, the software registration for the electronic device 16 may occur. The electronic device may request registration by sending the electronic device's serial number to the electronic device code repository 45. In one particular embodiment, the code repository may be retained at the ENTITY's data center and made available on a root controller system. The electronic device code repository validates the serial number 23 against the root controller device table 103 to ensure the status has been set to a status reflecting PENDING ACTIVATION and then validates the signature on code 46. If a serial number 23 was not previously listed in a status reflecting PENDING ACTIVATION state, then ENTITY can note an error and follow up any potential discrepancy for security concern 53. If a serial number 23 was previously listed in a status reflecting PENDING ACTIVATION state, then a validation may be performed to ensure that the serial number 23 has been properly associated with a user account 147 within the root controller device table 103. If the serial number 23 has not been properly associated with a user account 147 within the root controller device table 103, then the electronic device periodically retries 52 the software registration for the electronic device 16 until a user account 147 is associated with the serial number 23. If the serial number 23 has been properly associated with a user account 147 within the root controller device table 103, then a JID on the coordination server for the electronic device 50 is created. In one particular embodiment, the JID may comprise of the electronic device serial number 23. The status associated with the serial number 23 associated with the user account created 147 is updated in the root controller device table 103 to a status reflecting ACTIVATED state.

In a particular embodiment, the electronic device should be initialized with a root controller. To initialize the electronic device to root controller 17, the root controller sends the JID to the electronic device with instruction to begin an enrollment process for encryption enabling software capable of facilitating a public key infrastructure installation 53.

Referring now to FIG. 5, in one particular embodiment encryption enabling software capable of facilitating a public key infrastructure may comprise digital certificates. Under this particular embodiment, the electronic device then begins the certificate enrollment process 54. The web services interface for electronic devices is hosted on a root controller system. The web services interaction is initiated from the electronic device to the root controller only. No sessions are open inbound to the electronic device during the electronic device certificate enrollment process 54.

Upon conclusion of the certificate enrollment process 54, the electronic device may, in one embodiment, then log into a coordination server using the client digital certificate to encrypt communications and being the operational phase 21 with encryption enabling software capable of facilitating a public key infrastructure.

The electronic device generates public/private keys and a certificate signing request ("CSR") 540. In one embodiment, the common name or "CN" attribute value from the CSR comprises of the serial number 23. The electronic device produces a hash 541 of the JID 50 combined with the CSR content 540, using the secret code 22 as the key to the hash. In one particular embodiment, the electronic device connects to ENTITY's web service site, submits the CSR to a root controller via HTTPS 542 to begin the root controller CSR validation process 18. The data elements of the CSR comprise CSR contents, JID and JID/CSR hash.

Upon receipt of the CSR 542, the root controller will attempt to authenticate the electronic device by extracting the content of the CSR, and observing the CN attribute 181. The root controller takes the CN value from the CSR and compares against ENTITY's root controller device table 103 to discover what the corresponding secret code 22 is for the transmitted serial number 23 and to validate that the electronic device is set to a status reflecting ACTIVATED 182. The root controller attempts to determine whether the serial number 23 and associated secret code 22 can be found in the ENTITY's root controller device table 103 and that the serial number 23 is set to a status reflecting ACTIVATED 183. If the root controller fails to validate 183 any condition, then the electronic device is not authenticated and ENTITY can note an error and follow up any potential discrepancy for security concern 184. If the root controller successfully validates 183 all conditions, the root controller will then have a list of data, which comprises the CN value from the CSR, which matches the serial number 23, the secret code 22 corresponding to that serial number 23, and the unique system identifier and CSR combination that had been hashed with the secret code 22. The root controller performs hash on the JID and CSR element from the web services data using the secret code 22 as key 185.

In one particular embodiment, for additional authentication and validation within the process, the root controller may then validate to see if hashed values match the values received in web services data 186. If the hashed values do not match the values received in web services data, then the electronic device is not authenticated and ENTITY can note an error and follow up any potential discrepancy for security concern 184. If the hashed values do match the values received in web services data, then the root controller communicates a request, comprised of the CSR and serial number 23 of the electronic device, for first time issuance of a digital certificate for installation onto the electronic device to a digital certificate authority to which the root controller has access to submit such CSR request 543.

The digital certificate authority to which the root controller submits the request 543 should have an interface with the root controller capable of automated certificate issuance. In one particular embodiment, the certificate authority is internal to the data center and operations of ENTITY and as such, the certificate authority web services interface only allows connection from a defined list of IP addresses. In this embodiment, the certificate authority web services interface validates whether or not the root controller request submission 543 is from a defined list of IP address. If the root controller request submission 543 is not from the defined list of IP address, then ENTITY can note an error and follow up any potential discrepancy for security concern 191. If the root controller request submission 543 is from the defined list IP address, then the certificate authority web services may validate to ensure that a valid certificate was used in order to authenticate this interface 192. If the certificate authority web services cannot ensure that a valid certificate was used to authenticate this interface, then ENTITY can note an error and follow up any potential discrepancy for security concern 191. If the certificate authority web services can ensure that a valid certificate was used to authenticate this interface, then the certificate authority programmatically examines the contents of the CSR and may revalidate that the CN value on the CSR matches the serial number 23 of the electronic device 193 by comparing a CN value against listed serial numbers 23 from the CSR as transmitted by the root controller. If the certificate authority cannot revalidate that the CN value on the CSR matches the serial number 23 of the electronic device, then ENTITY can note an error and follow up any potential discrepancy for security concern 191. If the certificate authority can revalidate that the CN value on the CSR matches the serial number 23 of the electronic device, then the certificate authority will programmatically validate to determine whether a certificate has previously been issued for the electronic device associated with the serial number 23 matching the CN value 194. If a digital certificate is determined to have already been issued for the electronic device associated with the serial number 23 matching the CN value, then ENTITY can note an error and follow up any potential discrepancy for security concern 191. If a digital certificate is determined to have not already been issued for the electronic device associated with the serial number 23 matching the CN value, then the certificate authority is assured that a digital certificate does not already exist.

Upon conclusion of the validations comprising the certificate authority CSR validation Process 19, as described for one particular embodiment of the invention, the certificate authority will then generate a digital certificate file 544 in PEM or similar file format. The certificate authority then sends the digital certificate file 544 back to the root controller web services using HTTPS (Client/server digital certificates). The root controller will then take the digital certificate file 544 and send it to the electronic device 545. The electronic device stores the private key and public key in its internal memory 546. At no point will the electronic device transmit a private key to any other device. The client side digital certificate is now installed on the electronic device 547 as encryption enabling software capable of facilitating a public key infrastructure, thus enabling the secure encryption and decryption of messaging sent or received by the electronic device. The now secured electronic device enters the operational phase 56 to operate 58 and serve its intended purpose.

Electronic devices utilizing the present invention to install encryption enabling software capable of facilitating a public key infrastructure are able to participate in and benefit from all elements of the public key infrastructure, which comprise of software, hardware, policy and procedural elements used to administer encryption enabling software, such as but not necessarily limited to, digital certificates, and public-private key pairs, including the ability to issue, maintain, and revoke public key certificates. In one particular embodiment of the invention, the encryption enabling software capable of facilitating a public key infrastructure, such as but not limited to, digital certificates, may be renewed on a recurring basis as an element of a public key infrastructure by following an electronic device certificate renewal process 57. Such recurring basis may be any period of time 59 selected, in part, to optimize a balance between maximizing security with a time frame short enough to hinder attempts to crack the installed digital certificate while at the same time minimizing impact on additional nonoperational data communication and commercial impact. This recurring basis for upgrade may be any period of time 59 ranging from hourly to multi-decade, but preferably would range between every 1-3 years.

Referring now to FIG. 6, which depicts an embodiment of the electronic device certificate renewal process 57, at defined renewal intervals, the electronic device connects to ENTITY's coordination server, such as but not limited to a cloud interface, to communicate to the root controller a request for renewal of encryption enabling software capable of facilitating a public key infrastructure. In one embodiment, the electronic device generates public and private keys and a CSR comprised at minimum of the serial number of the electronic device in the "CN" field of the CSR subject 600. The electronic device creates a hash of the unique system identifier, previously assigned in the software registration phase 16, combined with the CSR content using the secret code as key 601. The electronic device then connects to ENTITY's web services site to submit the renewal CSR 602. In one particular embodiment, the unique system identifier may be a Jabber ID ("JID"). The renewal CSR 602 comprises of the CSR, JID, hash of the CSR and JID using the secret code as key to the hash, and flag. The flag may be any means of indication capable of communicating the request 602 as a renewal or factory reset. The request of the renewal CSR 602 to the root controller is encrypted using the currently installed encryption enabling software capable of facilitating a public key infrastructure. The encrypted request communication 602 is sent over a secure data protocol, including but not limited to HTTPS or XMPP.

Upon receipt of the renewal encrypted request communication 602, a validation process 61 is performed where the root controller extracts the content of the CSR, and observes the Common Name or "CN" attribute 603. The CN value from the CSR comprises of the serial number 23 of the electronic device. The root controller takes the CN value from the CSR and does a lookup in the root controller device table 103 to confirm that the electronic device is set to a status reflecting an ACTIVATED state 604. The root controller validates 605 to ensure that a matching serial number 23 along with an associated secret code 22 are present in the root controller device table 103 and that the serial number 23 is set to a status reflecting an ACTIVATED state. If the root controller fails to validate 605 the presence of a matching serial number 23 or that the electronic device is set to a status reflecting a state of ACTIVATED, then ENTITY can note an error and follow up any potential discrepancy for security concern 608. If the root controller successfully validates 605 the presence of a matching serial number 23 and the electronic device is set to a status reflecting a state of ACTIVATED, the root controller now has 3 pieces of information, comprising of the serial number 23 matching the CN value, the secret code 22 corresponding with the serial number 23, and the hashed JID and CSR using the secret code as the key. The root controller performs hash on the JID and CSR using the secret code 22 as the key 606. The root controller verifies 607 to determine if hashed value matches the value received from the electronic device. If the root controller fails to match the value received from the electronic device with the hashed value, then ENTITY can note an error and follow up any potential discrepancy for security concern 608. If the root controller successfully matches the value received from the electronic device with the hashed value, then the root controller validates 623 to determine whether the electronic device has an acceptable reputation score. A reputation score is defined as a proprietary, cumulative score based on the electronic device's behavioral patterns during the operational phase 56 of the electronic device. The reputation score may be decremented and incremented based on the electronic device's activity over a period of time. If the electronic device's reputation score is not acceptable, then ENTITY can note an error and follow up any potential discrepancy for security concern 608. If the electronic device's reputation score is acceptable, the validation process 61 is completed.

Upon successful completion of the validation process 61, the root controller communicates a request comprised of the CSR, serial number 23 of the electronic device, and flag for issuance of a renewed digital certificate for installation onto the electronic device to a digital certificate authority to which the root controller has access to submit such CSR request 609. The certificate authority recognizes 610 the presence of the flag within the CSR request 609 and begins the certificate authority renewal validation process 62.

The digital certificate authority to which the root controller submits the CSR request 609 should have an interface with the root controller capable of automated certificate issuance. In one particular embodiment, the certificate authority is internal to the data center and operations of ENTITY and as such, the certificate authority web services interface only allows connection from a defined list of IP addresses. In this embodiment, the certificate authority web services interface validates whether or not the root controller request submission 611 is from a defined list of IP address. If the root controller request submission 609 is not from the defined list of IP address, then ENTITY can note an error and follow up any potential discrepancy for security concern 612. If the root controller request submission 609 is from the defined list IP address, then the certificate authority web services may validate to ensure that a valid certificate was used in order to authenticate this interface 613. If the certificate authority web services cannot ensure that a valid certificate was used to authenticate this interface, then ENTITY can note an error and follow up any potential discrepancy for security concern 612. If the certificate authority web services can ensure that a valid certificate was used to authenticate this interface, then the certificate authority programmatically examines the contents of the CSR and may revalidate 614 that the CN value on the CSR matches the serial number 23 of the electronic device by comparing a CN value against listed serial numbers 23 from the data as transmitted by the root controller. If the certificate authority cannot revalidate 614 that the CN value on the CSR matches the serial number 23 of the electronic device, then ENTITY can note an error and follow up any potential discrepancy for security concern 612. If the certificate authority can revalidate 614 that the CN value on the CSR matches the serial number 23 of the electronic device, then the certificate authority may, in one embodiment, proceed to perform a validation 615 to ensure that the CSR for renewal was received during the defined renewal interval. If the certificate authority determines that the CSR was received outside of the anticipated renewal interval, then ENTITY can note an error and follow up any potential discrepancy for security concern 612. If the certificate authority determines that the CSR was received during the anticipated renewal interval, then the certificate authority may perform additional validations. In one particular embodiment, the certificate authority may validate 616 whether or not the flag was set in the CSR request 609. If the flag was not set, then ENTITY can note an error and follow up any potential discrepancy for security concern 612. If the flag was set, then the certificate authority may, in one embodiment, validate 617 to determine whether the number of CSR renewal requests submitted with a flag indicating renewal or factory reset over the past defined renewal interval is more than a configured tolerance, as set by the certificate authority. If the number of CSR renewal requests submitted with a flag indicating renewal or factory reset over the past defined renewal interval is more than a configured tolerance, then ENTITY can note an error and follow up any potential discrepancy for security concern 612. If the number of CSR renewal requests submitted with a flag indicating renewal or factory reset over the past defined renewal interval is less than or equal to a configured tolerance, then the certificate authority is assured that the CSR is proper and that a renewal digital certificate should be issued. The certificate authority then completes the certificate authority renewal validation process 62.

Upon conclusion of the validations comprising the certificate authority renewal validation process 62, as described for one particular embodiment of the invention, the certificate authority will then generate a digital certificate file 618. The certificate authority then sends 619 the digital certificate file 618 back to the root controller web services. The root controller will then take the digital certificate file 618 and send it to the electronic device 620. The electronic device stores the private key and new public key in its internal memory 621 replacing existing digital certificate information. The renewed client side digital certificate is now installed on the electronic device 622 as encryption enabling software capable of facilitating a public key infrastructure, thus enabling the secure encryption and decryption of messaging sent or received by the electronic device.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. A method for the secure distribution of digital certificates for electronic devices manufactured by a third party, comprising the steps of:
   manufacturing an electronic device using a third party, and installing a unique serial number and secret code on the electronic device, along with a software system image;
   an end user powering on the electronic device after it has been sold;
   setting up internet access for the electronic device and an account with a requester server;
   initiating a certificate enrollment process which causes the electronic device to generate a private key, a public key, and a certificate signing request;
   sending a hashed version of the certificate signing request to the requester server, using the secret code as a key;
   a certificate file is generated and sent to the electronic device, and
   storing the public key and private key in a memory of the electronic device, thereby enabling the electronic device to encrypt and decrypt messaging with the requester server, using its public and private keys;
   wherein the electronic device communicates wherein the requester server is comprised of a root controller and a coordination server, the electronic device communicating with the root controller via a secured protocol, and the electronic device communicating with the coordination server via a secured protocol, and
   wherein the electronic device is assigned a unique system identifier by the requester server, and the electronic device sends the requester server a certificate signing request ("CSR"), its unique system identifier, and a hash combination of the unique system identifier and CSR, hashed using the secret code as a key.

2. The method of claim 1 wherein the unique system identifier is a Jabber ID.

3. The method of claim 1 wherein the certificate file is only sent to the electronic device if its serial number is validated, its secret code is validated, and the serial number has a status of activated in the requester server.

4. The method of claim 3 wherein the certificate is valid only for a defined period of time, and wherein the electronic device automatically requests renewal of the certificate at a predefined renewal interval.

5. The method of claim 4 wherein the renewal interval is one year.

6. An electronic device which can securely message with a requester server, comprising:
   a microprocessor;
   a communications device which allows the electronic device to communicate with the requester server via the internet;
   a memory, the memory containing a program for generating a private key and a public key, the private key and public key only being generated when the electronic device is powered up by an end user, and further the private key never being transmitted outside the electronic device;

the memory also containing a serial number and secret code which uniquely identifies the electronic device;

wherein upon being powered up, the electronic device verifies via the requester server, using its serial number, that it has a status of pending activation and that no other device with its serial number has been activated before, and only if these conditions are satisfied will the private key be generated by the program on the electronic device, whereby the requester server generates and issues a digital certificate and sends it to the electronic device, thereby enabling the electronic device to encrypt and decrypt messaging with the requester server using its public and private keys;

wherein the electronic device communicates with the requester server wherein the requester server is comprised of a root controller and a coordination server, the electronic device communicating with the root controller via a secured protocol, and the electronic device communicating with the coordination server via a secured protocol, and wherein the electronic device is assigned a unique system identifier by the requester server, and the electronic device sends the requester server a certificate signing request ("CSR"), its unique system identifier, and a hash combination of the unique system identifier and CSR, hashed using the secret code as a key.

7. The electronic device of claim 6 wherein the unique system identifier is a Jabber ID.

8. The electronic device of claim 6 wherein the certificate file is only sent to the electronic device if its serial number is validated, its secret code is validated, and the serial number has a status of activated in the requester server.

9. The electronic device of claim 6 wherein the certificate is valid only for a defined period of time, and wherein the electronic device automatically requests renewal of the certificate at a predefined renewal interval.

10. The electronic device of claim 6 wherein the renewal interval is one year.

* * * * *